Figure 1:
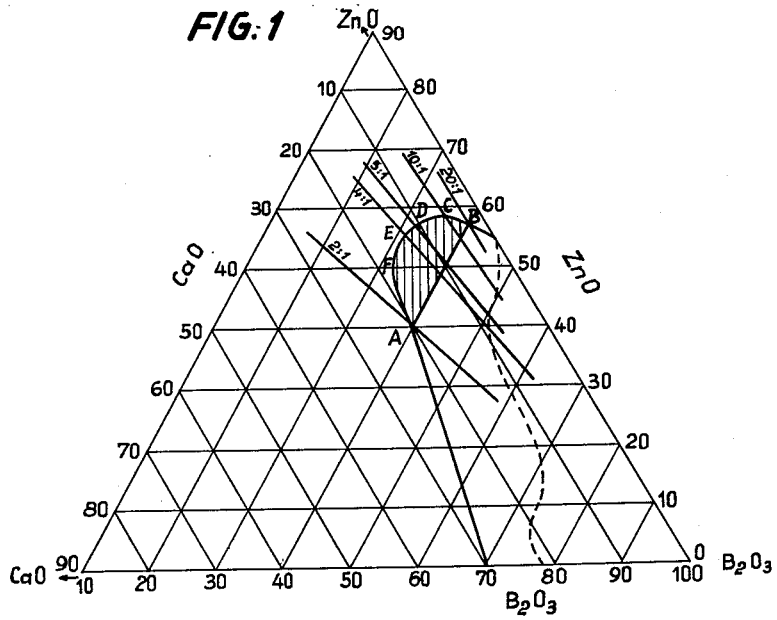

Jan. 22, 1963  W. GEFFCKEN ETAL  3,074,805
OPTICAL GLASS
Filed Jan. 20, 1959

INVENTORS
WALTER GEFFCKEN and
MARGA FAULSTICH
By Burgess, Dinklage + Sprung
ATTORNEYS

3,074,805
OPTICAL GLASS
Walter Geffcken and Marga Faulstich, Mainz, Germany, assignors to Jenaer Glaswerk Schott & Gen., Mainz, Germany, a German corporation
Filed Jan. 20, 1959, Ser. No. 787,841
Claims priority, application Germany Jan. 25, 1958
15 Claims. (Cl. 106—47)

The present invention relates to improvements in optical glass and more particularly to a glass as described in our copending application Serial No. 773,106, filed on Nov. 10, 1958.

In this prior application we described glass species of a very extreme optical position which is attained by mixing a stable glass consisting of lanthanum oxide, thorium oxide and boric acid with a stable glass consisting of alkaline earth and borate and/or zinc, lithium, and borate, or cadmium, lithium, and borate, and by providing a mixing ratio so that the molar ratio of the entire bivalent oxides plus the $Li_2O$ relative to the boric acid will remain below 0.2.

It has now been found that according to the present invention glass compositions having a refractive index $n_d$ of more than approximately 1.71 will result in very valuable glass species if the mentioned molar ratio has a higher value and the proportion by weight of ZnO and/or CdO relative to alkaline earth oxide plus $Li_2O$ is made at least 2:1. The particular value of such glass species resides no longer merely in their extreme optical position, but in the fact that such species have a very low susceptibility to crystallization and can therefore be produced in large batches. Such an increase in the quantity of each batch is, however, of the greatest importance since for an economical mass production of different glass series, the glass within each series should have the same refractive index and the refraction should not be subject to variations which are unavoidable to a certain extent if the glass has to be made in several batches and which can be avoided only if a large number of glass pieces can be worked out of a single batch.

The development of optical glass therefore proceeds in two different directions. One of them like the present invention seeks to improve more and more the stability of certain types or species of mass produced glass, while the other seeks to attain glass species of an extreme optical position while taking into account great difficulties in the manufacture of such glass. The latter applies, for example, to the published German patent application No. 1,008,456. However, none of the glass species described in the different examples of this application can be produced in larger batches or units.

It constitutes a particular advantage of mixtures such as described in our prior application mentioned above that thorium-free glass consisting of 60% of $La_2O_3$ and 40% of $B_2O_3$ can be used as the first mixture component (I) of the system formed of $La_2O_3$, $ThO_2$ and $B_2O_3$ if the quantity of the second component (II) consisting of a stable glass of the system formed of alkaline earth oxide, $Li_2O$, ZnO, CdO, and $B_2O_3$ amounts to at least 5%. The different species of glass attained according to the present invention clearly prove that this "5% condition" is always fulfilled. It is therefore possible in this manner to produce many different species of very stable, thorium-free glass which have an optical position which is still very excellent, as shown by the following table.

In order to explain what is to be meant by a stable glass of the system formed of alkaline earth oxide, $Li_2O$, ZnO, and $B_2O_3$, reference is made to FIGURE 1 showing the system formed of ZnO, CaO, and $B_2O_3$. The edge indicated in dotted lines signifies that beyond this limit a phase separation occurs, while the fully drawn line signifies the limit of the occurrence of a strong crystallization. The area within the mentioned limits is to be regarded as the range of the stable glass species. It will be seen that the region within which such glass reaches the maximum refraction and which substantially coincides with the region of the lowest content in boric acid lies at approximately 55% of ZnO, 14% of CaO, and the remainder of $B_2O_3$. The ratio of ZnO to CaO therefore amounts to approximately 4.1. FIGURE 1 has plotted therein the line which is applicable to compositions in which ZnO and CaO are in the mentioned ratio of 4:1, as well as the lines designating the weight ratios of 2:1, 5:1, 10:1, and 20:1.

It will thus be seen that the most favorable compositions lie within this region. Outside of this region it would be necessary to increase the content in boric acid considerably in order to avoid a crystallization. Consequently, a glass of this kind would have poorer optical values. It is therefore advisable to utilize as the second component (II) of the glass mixture a composition which lies within the region defined by the almost rectilinear connection of points A (40/20/40), B (57/3/40), C (58/636), D (57.5/10/32.5), E (55/14/31), and F (50/1832). This region is indicated in FIGURE 1 by hatching. The three numerical values stated above in parentheses behind A, B, C, D, E, and F represent the content in ZnO, CaO, and $B_2O_3$, respectively, in percent by weight.

Mixtures in which the second component (II) consists of glass species which lies within the mentioned region are characterized by excellent optical values and highest stability.

The condition mentioned at the beginning that the weight ratio of ZnO to alkaline earth oxide plus $Li_2O$ should amount to at least 2 has been indicated in FIGURE 1 by the line $ZnO/CaO=2:1$. The region at the right of this line then complies with the mentioned condition.

Figure 2:
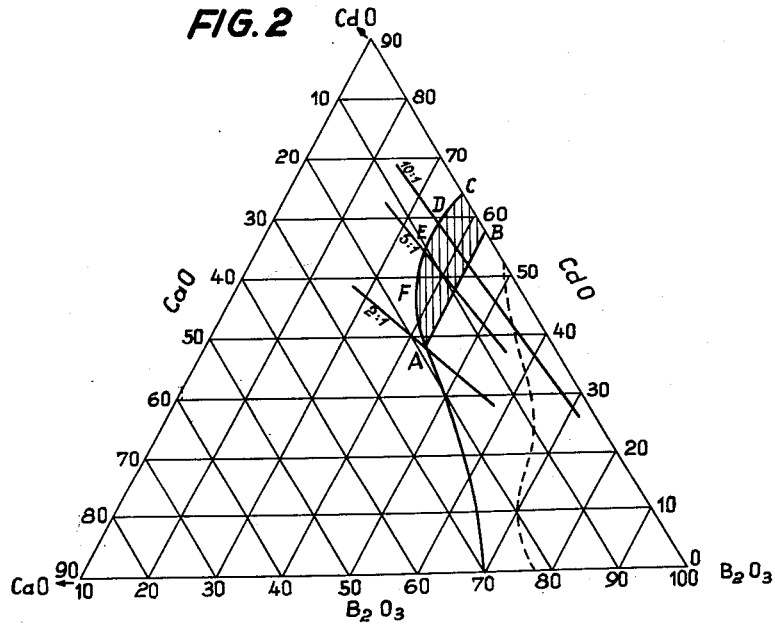

FIGURE 2 applies to the analogous system formed of CdO, CaO, and $B_2O_3$. Here too there is a relatively small region within which a maximum refraction may be attained and which is therefore of special importance when used as a mixing glass. The condition that the ratio of CdO to CaO should be 2:1 also applies to this glass. Maximum refractive values are attainable beyond this ratio, that is, for weight ratios of 5:1 and more.

Similarly as for the system containing ZnO, it is also possible for the system containing cadmium to define a region, as shown by the hatched part in FIGURE 2, which is especially suitable for use as the second component (II). This region is limited by an approximately rectilinear connection of the points A (38/19/43), B (57/0/43), C (64/0/36), D (59/6/35), E (53/12/35), and F (46/16/38). The three numerical values stated within the parentheses again represent the content in CdO, CaO, and $B_2O_3$, respectively, in percent by weight.

The region in which phase-separation occurs at a small CaO content may be avoided, as already stated in our mentioned earlier application, by an addition of small amounts of alkali to the glass. Even such small amounts as 2.5% of $Li_2O$ will be sufficient for producing glass species with a boric acid content of more than 70% without phase separation, even though the CaO content is zero. If the CaO content is higher than zero the necessary amount of $Li_2O$ will be even smaller. In any case, the required amounts of $Li_2O$ may be extremely small. The same applies to the analogous systems containing CdO. An unnecessarily high addition of alkali is unfavorable as it shifts the limits of crystallization toward higher $B_2O_3$ values.

If a stable glass formed of $ZnO$, $B_2O_3$, and $CaO$ is mixed with a stable glass formed of $CdO$, $B_2O_3$, and $CaO$, the resulting mixed glass will likewise be stable. It is even possible that a more thorough investigation will show that the region of existence of such mixed glass species will sometimes be even larger than the region resulting from the calculation of the mixing process. If this is true, it should be admissible that the glass of the second component may lie within this enlarged region. The actual determination of these enlarged regions may be regarded as a mere matter of practice.

The glass species according to the present invention may be provided with additions of $ZrO_2$ and $WO_3$. This increases the refractive index, although at the expense of the $\nu$ value. Therefore, no more than 6% of $ZrO$ and no more than 4% of $WO_3$ relative to the total weight should generally be used. As customary in glass species of the $La_2O_3$-$B_2O_3$ type, it is also possible to add $Ta_2O_5$ which has a similar effect as $WO_3$. Because of the high cost, the $Ta_2O_5$ content will seldom be increased for above 5%. The boric acid may be partly replaced by silicic acid, but the tendency toward crystallization as well as the $\nu$ value will then slightly decrease so that such a replacement, for example, up to 6%, is recommendable only if the resistnace against disintegration is to be increased. An equivalent substitution of $CaO$ by $SrO$ and $BaO$ is possible within certain limits, but produces no particular advantage.

Only a determination of the composition as extensive and accurate as herein described gives the assurance that the respective glass species may be produced in practical quantities without any deficiencies. Even very small amounts of certain ingredients, whether too much or too little, in such extreme glass compositions may have a decisive influence upon the results.

The following examples are given to indicate how the composition of the glass species according to the invention is to be calculated.

EXAMPLE 1

Component I:
  60% of $La_2O_3$
  40% of $B_2O_3$
Component II:
  52% of $ZnO$ ⎱ Weight ratio of ZnO
  15% of $CaO$ ⎰ to CaO=3.45
  33% of $B_2O_3$ In order of succession, 0.25, 0.35, 0.50, 0.80, and 1 part of component II are mixed with one part of component I.

The calculation then results, for example, in

|  | | Percent by weight |
|---|---|---|
| $La_2O_3$ | 60 =60.00 | 48.00 |
| $B_2O_3$ | 40+0.25×33=48.25 | 38.60 |
| $CaO$ | 0.25×15= 3.75 | 3.00 |
| $ZnO$ | 0.25×52=13.00 | 10.40 |

Herefrom results:

| Ratio of components | a 0.25:1 | b 0.35:1 | c 0.50:1 | d 0.80:1 | e 1:1 |
|---|---|---|---|---|---|
| $La_2O_3$ | 48.0 | 44.4 | 40.0 | 33.4 | 30.0 |
| $B_2O_3$ | 38.6 | 38.3 | 37.7 | 37.0 | 36.5 |
| $CaO$ | 3.0 | 3.89 | 5.0 | 6.66 | 7.5 |
| $ZnO$ | 10.4 | 13.5 | 17.3 | 23.1 | 26.0 |

Molar ratio:

| | a | b | c | d | e |
|---|---|---|---|---|---|
| $\frac{CaO}{B_2O_3}$ | 0.0966 | 0.126 | 0.165 | 0.224 | 0.257 |
| $\frac{ZnO}{CaO}$ | 2.40 | 2.40 | 2.40 | 2.40 | 2.40 |
| $\frac{Bivalent\ ions}{B_2O_3}$ | 0.329 | 0.427 | 0.560 | 0.761 | 0.873 |

EXAMPLE 2

Component I:
  60% of $La_2O_3$
  40% of $B_2O_3$
Component II:
  58% of $ZnO$ ⎱ Weight ratio of
  9% of $CaO$ ⎰ ZnO to CaO=6.45
  33% of $B_2O_3$

| Ratio of components | a 0.25:1 | b 0.35:1 | c 0.50:1 |
|---|---|---|---|
| $La_2O_3$ | 48.0 | 44.4 | 40.0 |
| $B_2O_3$ | 38.6 | 38.3 | 37.7 |
| $CaO$ | 1.80 | 2.32 | 3.0 |
| $ZnO$ | 11.6 | 15.1 | 19.3 |

Molar ratio:

| | a | b | c |
|---|---|---|---|
| $\frac{CaO}{B_2O_3}$ | 0.058 | 0.0756 | 0.099 |
| $\frac{ZnO}{CaO}$ | 4.46 | 4.46 | 4.46 |
| $\frac{Bivalent\ ions}{B_2O_3}$ | 0.317 | 0.714 | 0.541 |

EXAMPLE 3

Component I:
  60% of $La_2O_3$
  40% of $B_2O_3$
Component II:
  55% of $ZnO$ ⎱ Weight ratio of
  2% of $Li_2O$ ⎰ ZnO to Li2O=27
  43% of $B_2O_3$

| Ratio of components | a 0.25:1 | b 0.35:1 | c 0.50:1 |
|---|---|---|---|
| $La_2O_3$ | 47.9 | 44.4 | 40.0 |
| $B_2O_3$ | 40.6 | 40.8 | 41.0 |
| $ZnO$ | 10.95 | 14.2 | 18.0 |
| $Li_2O$ | 0.4 | 0.52 | 0.66 |

Molar ratio:

| | a | b | c |
|---|---|---|---|
| $\frac{Li_2O}{B_2O_3}$ | 0.023 | 0.0296 | 0.0375 |
| $\frac{ZnO}{Li_2O}$ | 8.5 | 8.5 | 8.5 |
| $\frac{Li_2O+ZnO}{B_2O_3}$ | 0.258 | 0.331 | 0.418 |

EXAMPLE 4

Component I:
  60% of $La_2O_3$
  40% of $B_2O_3$
Component II:
  53% of $CdO$ ⎱ Weight ratio of
  12% of $CaO$ ⎰ CdO to CaO=4.4
  35% of $B_2O_3$

| Ratio of components | a 0.25:1 | b 0.35:1 | c 0.50:1 | d 0.80:1 | e 1:1 |
|---|---|---|---|---|---|
| $La_2O_3$ | 48.0 | 44.4 | 40.0 | 33.4 | 30.0 |
| $B_2O_3$ | 39.0 | 38.7 | 38.3 | 37.7 | 37.5 |
| $CaO$ | 2.4 | 3.1 | 4.0 | 5.3 | 6.0 |
| $CdO$ | 10.6 | 13.8 | 17.7 | 23.6 | 26.5 |

Molar ratio:

| | a | b | c | d | e |
|---|---|---|---|---|---|
| $\frac{CaO}{B_2O_3}$ | 0.076 | 0.100 | 0.130 | 0.175 | 0.199 |
| $\frac{CdO}{CaO}$ | 1.93 | 1.93 | 1.93 | 1.93 | 1.93 |
| $\frac{Bivalent\ ions}{B_2O_3}$ | 0.223 | 0.293 | 0.381 | 0.512 | 0.583 |

The $n_d$ and $\nu$ values of the respective glass species are entered in the table under 1a to 1e, 2a to 2c, 3a to 3c, and 4a to 4e. This table also discloses additional examples.

Table

| Examples | 1a | 1b | 1c | 1d | 1e | 2a | 2b | 2c |
|---|---|---|---|---|---|---|---|---|
| $La_2O_3$ | 48.0 | 44.4 | 40.0 | 33.4 | 30.0 | 48.0 | 44.4 | 40.0 |
| $B_2O_3$ | 38.6 | 38.3 | 37.7 | 37.0 | 36.5 | 38.6 | 38.3 | 37.7 |
| CaO | 3.0 | 3.89 | 5.0 | 6.66 | 7.5 | 1.8 | 2.32 | 3.0 |
| ZnO | 10.4 | 13.5 | 17.3 | 23.1 | 26.0 | 11.6 | 15.1 | 19.3 |
| $Li_2O$ | | | | | | | | |
| CdO | | | | | | | | |
| $ZrO_2$ | | | | | | | | |
| $WO_3$ | | | | | | | | |
| $SiO_2$ | | | | | | | | |
| $n_{dv}$ | 1.7228 | 1.7204 | 1.7180 | 1.7126 | 1.7103 | 1.7226 | 1.7209 | 1.7190 |
|  | 53.7 | 53.3 | 52.9 | 52.2 | 52.0 | 53.3 | 53.0 | 52.8 |

| Examples | 3a | 3b | 3c | 4a | 4b | 4c | 4d | 4e |
|---|---|---|---|---|---|---|---|---|
| $La_2O_3$ | 47.9 | 44.4 | 40.0 | 48.0 | 44.4 | 40.0 | 33.4 | 30.0 |
| $B_2O_3$ | 40.6 | 40.8 | 41.0 | 39.0 | 38.7 | 38.3 | 37.7 | 37.5 |
| CaO | | | | 2.4 | 3.1 | 4.0 | 5.3 | 6.0 |
| ZnO | 10.95 | 14.2 | 18.0 | | | | | |
| $Li_2O$ | 0.4 | 0.52 | 0.66 | | | | | |
| CdO | | | | 10.6 | 13.8 | 17.7 | 23.6 | 26.5 |
| $ZrO_2$ | | | | | | | | |
| $WO_3$ | | | | | | | | |
| $SiO_2$ | | | | | | | | |
| $n_{dv}$ | 1.7166 | 1.7075 | 1.7069 | 1.7292 | 1.7285 | 1.7285 | 1.7269 | 1.7254 |
|  | 54.2 | 54.5 | 54.1 | 53.0 | 52.5 | 51.9 | 51.1 | 50.55 |

| Examples | 5 | 6 | 7 | 8 | 9 | 10 |
|---|---|---|---|---|---|---|
| $La_2O_3$ | 43.0 | 36.0 | 44.0 | 44.0 | 43.0 | 40.0 |
| $B_2O_3$ | 37.7 | 38.0 | 38.0 | 29.0 | 37.6 | 38.0 |
| CaO | | 4.0 | | 4.0 | | 4.0 |
| ZnO | 11.2 | 16.0 | 12.0 | 8.0 | | 12.0 |
| $Li_2O$ | 0.3 | | | | 0.3 | |
| CdO | | | | | 11.21 | |
| $ZrO_2$ | 4.5 | 6.0 | 6.0 | 6.0 | 4.5 | 6.0 |
| $WO_3$ | 3.3 | | | | 3.3 | |
| $SiO_2$ | | | | 9.0 | | |
| $n_{dv}$ | 1.7332 | 1.7267 | 1.7327 | 1.7286 | 1.7432 | 1.7345 |
|  | 51.0 | 51.7 | 51.3 | 51.1 | 49.75 | 50.98 |

An approved method is the following:

At a moderate temperature, one of 1250° C. being usually sufficient, the well-homogenized mixture is inserted into a platinum crucible in an electric furnace and, after being completely melted, the temperature is increased by about 100° C. in order to expel the bubbles. As a refining agent, $As_2O_3$ in amounts up to 0.5% is for this purpose especially recommended. Only if there are greater amounts of $ZrO_2$ and $Ta_2O_5$, it may sometimes be necessary to increase the melting temperature up to 1400° C. so that everything will go into solution. It is then advisable to grind these materials as fine as possible so that they will not merely sink to the bottom. After refining, which requires for a 400 g. batch approximately 1/2 hour, the mass is well homogenized by the stirring it for about 1/4 hour at about 120° C. with a platinum stirrer and, while being uniformly stirred, it is then cooled down to about 1050° or 1000° C. within 1/4 hour. It is then cast in the usual manner into a steel mold, which has been rubbed with magnesium oxide and preferably preheated to about 300° C., and it is then slowly cooled in an annealing furnace. If the purest possible raw materials are used, the glass types according to the invention will be practically colorless, even at refractive indices above 1.77. They are hard and well polishable and fully comply with the requirements which may be made of them, for example for photographic lenses.

We claim:

1. An optical glass effectively stable against devitrification consisting essentially of a mixture of 95–50% by weight of a first glass component consisting of 60% $La_2O_3$ and 40% $B_2O_3$; and 5–50% by weight of a second glass component consisting of the combination of (a) $B_2O_3$, (b) at least one of ZnO and CdO, and (c) at least one of alkaline earth oxides and $Li_2O$; wherein the molar ratio of the total of both the said (b) and (c) constituents present in said second component to the total $B_2O_3$ present in both components exceeds a value of 0.2, and wherein the weight ratio of the said (b) to the said (c) constituents amounts to at least 2.

2. An optical glass as defined in claim 1, wherein the second component consists of a glass formed of ZnO, CaO, and $O_2B_3$ and having a composition lying within a range defined by a substantially rectilinear connection of the points A (40/20/40), B (57/3/40), C (58/6/36), D (57.5/10/32.5), E (55/14/31), and F (50/18/32), wherein said three numerical values in parentheses designate the content in ZnO, CaO, and $B_2O_3$, respectively, in percent by weight.

3. An optical glass as defined in claim 1, wherein the second component consists of a glass formed of CdO, CaO, and $B_2O_3$ having a composition lying within a range defined by a substantially rectilinear connection of the points A (38/19/43), B (57/0/43), C (64/0/36), D (59/6/35), E (53/12/35), and F (46/16/38), wherein said three numerical values in parentheses designate the content in CdO, CaO, and $B_2O_3$, respectively, in percent by weight.

4. A optical glass effectively stable against devitrification consisting essentially of the following composition in percent by weights:

43.0% of $La_2O_3$
    37.7% of $B_2O_3$
    11.2% of ZnO
    0.3% of $Li_2O$
    4.5% of $ZrO_2$
    3.3% of $WO_3$

5. An optical glass effectively stable against divitrification consisting essentially of the following composition in percent by weight:

44.0% of $La_2O_3$
    38.0% of $B_2O_3$
    12.0% of ZnO
    6.0% of $ZrO_2$

6. A optical glass effectively stable against devitrification consisting essentially of the following composition in percent by weight:

40.0% of $La_2O_3$
    38.0% of $B_2O_3$
    4.0% of CaO
    12.0% of ZnO
    6.0% of $ZrO_2$

7. An optical glass effectively stable against devitrification consisting essentially of a mixture of at least two glass members selected from the group consisting of the three glass members having the following compositions in percent by weight respectively:

glass member (1)

43.0% of $La_2O_3$
    37.7% of $B_2O_3$
    11.2% of ZnO
    0.3% of $Li_2O$
    4.5% of $ZrO_2$
    3.3% of $WO_3$ glass member (2)

44.0% of $La_2O_3$
    38.0% of $B_2O_3$
    12.0% of ZnO
    6.0% of $ZrO_2$ and glass member (3)

40.0% of $La_2C_3$
    38.0% of $B_2O_3$
    4.0% of CaO
    12.0% of ZnO
    6.0% of $ZrO_2$

8. Glass according to claim 1 wherein said glass additionally contains a member selected from the group consisting of $ZrO_2$, $WO_3$ and mixtures thereof, said $ZrO_2$ being present in an amount up to 6% by weight and said $WO_3$ being present in an amount up to 4% by weight.

9. Glass according to claim 1 wherein said glass additionally contains $Ta_2O_5$ up to about 5% by weight.

10. Glass according to claim 1 wherein up to 6% by weight of $B_2O_3$ is replaced by an equal amount of $SiO_2$.

11. Glass according to claim 1 wherein said second component contains ZnO and alkaline earth oxide, the weight ratio of said ZnO to alkaline earth oxide having a value of about 4.

12. Glass according to claim 1 wherein said second component contains CdO and CaO, the weight ratio of said CdO to CaO having a value of about 5.

13. An optical glass being effectively stable against devitrification and having an $n_d$ of from 1.700 to 1.745 and a $\nu$-value of from 49 to 55; consisting of a mixture of from 95–50% by weight of a first glass component consisting of 60% $La_2O_3$ and 40% $B_2O_3$; and from 5–50% by weight of a second glass component consisting of the combination alkaline earth oxide, CdO, ZnO and $B_2O_3$, and optionally $Li_2O$ wherein the molar ratio of bivalent oxides plus $Li_2O$ to the $B_2O_3$ exceeds a value of 0.2 and wherein the weight ratio of a member selected from the group consisting of ZnO, CdO and ZnO+CdO to alkaline earth oxide plus $Li_2O$ amounts to at least 2.

14. An optical glass component representing from 5 to 50% by weight of a $La_2O_3$-$B_2O_3$-containing optical glass, for imparting effectively stable characteristics with respect to devitrification inhibition of the glass, which consists of a mixture of (a) $B_2O_3$, (b) at least one of ZnO and CdO, and (c) at least one of alkaline earth oxide and $Li_2O$, wherein the molar ratio of the total of both the said (b) and (c) constituents present to the total $B_2O_3$ present in the glass exceeds a value of 0.2, while the weight ratio of the said (b) to said (c) constituents amounts to at least 2.

15. In an optical glass containing $La_2O_3$, $B_2O_3$ and optionally $ThO_2$, the improvement for imparting effectively stable characteristics with respect to devitrification inhibition of the glass, said glass having an $n_d$ of from about 1.700 to 1.745 and a $\nu$-value of from 49 to 55, which consists essentially of including in said glass as a minor proportion thereof but representing at least 5% and at most 50% by weight of the total glass, a simultaneous mixture of (a) $B_2O_3$, (b) a member selected from the group consisting of ZnO, CdO and mixtures thereof, and (c) a member selected from the group consisting of alkaline earth oxide, $Li_2O$ and mixtures thereof, wherein the molar ratio of the total constituents of both said (b) and (c) present to the $B_2O_3$ present in the glass exceeds a value of 0.2 while the total weight of the constituents of (b) is at least 2 times the total weight of the constituents of (c).

References Cited in the file of this patent

UNITED STATES PATENTS

| | | |
|---|---|---|
| 2,434,148 | De Paolis | Jan. 6, 1948 |
| 2,861,000 | Geffcken et al. | Nov. 18, 1958 |
| 2,866,712 | Weissenberg et al | Dec. 30, 1958 |
| 2,899,322 | Bromer et al. | Aug. 11, 1959 |

FOREIGN PATENTS

| | | |
|---|---|---|
| 615,286 | Great Britain | Jan. 4, 1949 |

UNITED STATES PATENT OFFICE
CERTIFICATE OF CORRECTION

Patent No. 3,074,805                    January 22, 1963

Walter Geffcken et al.

It is hereby certified that error appears in the above numbered patent requiring correction and that the said Letters Patent should read as corrected below.

Column 2, line 10, for "4.1" read -- 4:1 --; line 24, for "(58/636)" read -- (58/6/36) --; line 25, for "(50/1832)" read -- (50/18/32) --; same column 2, line 31, for "lies" read -- lie --; column 5, line 55, strike out "the"; line 57, after "within" insert -- about --; line 60, strike out "it"; line 75, for "oxides" read -- oxide --; column 6, line 8, for "$O_2B_3$" read -- $B_2O_3$ --; line 26, for "weights" read -- weight --; same column 6, lines 33 and 34, for "divitrification" read -- devitrification --; line 66, for "$La_2C_3$" read -- $La_2O_3$ --; column 8, line 7, for "divitrification" read -- devitrification --; line 18, before "$B_2O_3$" insert -- total --.

Signed and sealed this 17th day of September 1963.

(SEAL)
Attest:

ERNEST W. SWIDER                           DAVID L. LADD
Attesting Officer                            Commissioner of Patents